United States Patent [19]

Shimizu

[11] Patent Number: 4,703,821

[45] Date of Patent: Nov. 3, 1987

[54] ELECTRIC POWER STEERING SYSTEM FOR VEHICLES

[75] Inventor: Yasuo Shimizu, Tochigi, Japan

[73] Assignee: Honda, Tokyo, Japan

[21] Appl. No.: 780,125

[22] Filed: Sep. 25, 1985

[30] Foreign Application Priority Data

Sep. 27, 1984 [JP] Japan .................................. 59-202470

[51] Int. Cl.⁴ .............................................. B62D 5/04
[52] U.S. Cl. ................................ 180/79.1; 74/388 PS; 180/142; 180/143; 318/2; 318/488
[58] Field of Search ..................... 180/79.1, 79.3, 141, 180/142, 143; 74/388 PS; 318/2, 488; 73/862.31

[56] References Cited

U.S. PATENT DOCUMENTS

| | | | |
|---|---|---|---|
| 2,754,465 | 7/1956 | Brier | 318/488 |
| 3,983,953 | 10/1976 | Bayle | 180/79.1 |
| 4,173,265 | 11/1979 | Kremer | 180/79.1 |
| 4,448,275 | 5/1984 | Kitagawa et al. | 180/79.1 |
| 4,538,698 | 9/1985 | Hashimoto et al. | 180/79.1 |

FOREIGN PATENT DOCUMENTS

| | | | |
|---|---|---|---|
| 1286 | 1/1980 | Japan | 180/143 |
| 160830 | 9/1983 | Japan | 73/862.31 |
| 3336272 | 4/1984 | Japan | 180/79.1 |
| 59-70257 | 4/1984 | Japan . | |
| 100059 | 6/1984 | Japan | 180/79.1 |
| 59-227560 | 12/1984 | Japan . | |

*Primary Examiner*—John J. Love
*Assistant Examiner*—Mitchell J. Hill
*Attorney, Agent, or Firm*—Armstrong, Nikaido, Marmelstein & Kubovcik

[57] ABSTRACT

An electric power steering system (100) for vehicles includes a driving control circuit (50) adapted to generate a torque magnitude signal (Sa) and a torque direction signal (Sdr, Sdl), based on an output signal (VR, VL) from a torque detection mechanism (4, 9) for detecting the magnitude and the direction of steering torque acting on an input shaft (101) connected to a steering wheel (8), and to feed, to an electric motor (5) for supplying auxiliary torque to an output shaft (3) operatively interconnected with a steered ground wheel, an armature current (Io) of such a magnitude and in such a direction of conduction as desirous in accordance with both the torque magnitude signal (Sa) and the torque direction signal (Sdr, Sdl). The steering shaft (101) comprises a first shaft (1) connected to the steering wheel (8), a second shaft (2) interconnected with the first shaft (1), and a third shaft (3) as the output shaft (3) interconnected with the second shaft (2), and a torque detecting means (4, 9) comprising a torque direction detecting mechanism (4) interposed between the first shaft (1) and the second shaft (2), and a torque magnitude detecting mechanism (9) interposed between the second shaft (2) and the third shaft (3).

4 Claims, 16 Drawing Figures

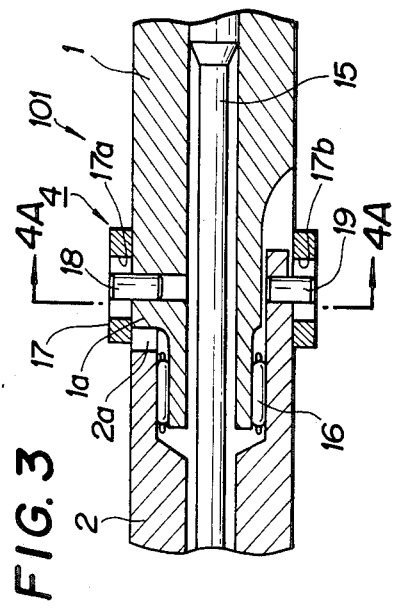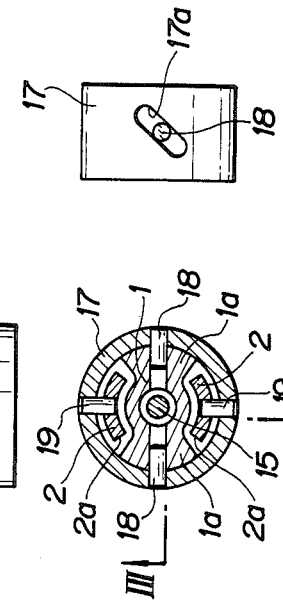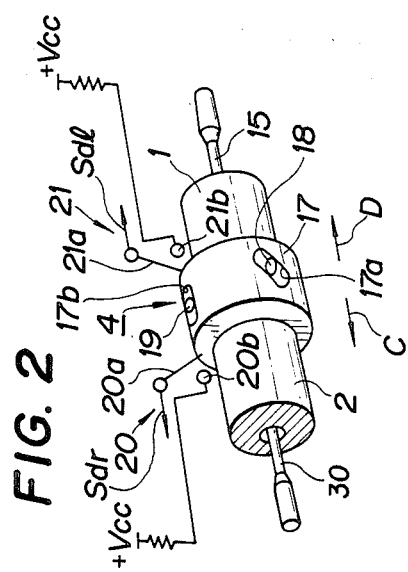

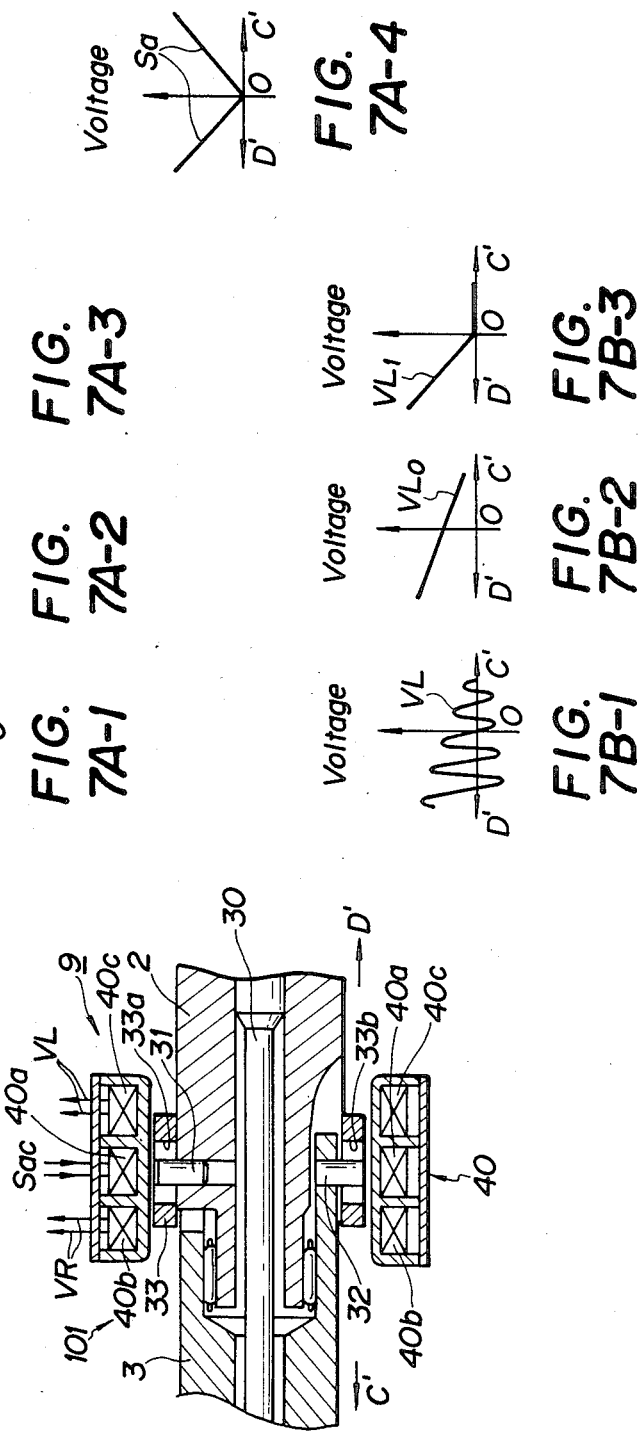

ELECTRIC POWER STEERING SYSTEM FOR VEHICLES

BACKGROUND OF THE INVENTION

1. Field of the Invention

The present invention generally relates to a steering system for vehicles. More particularly, the invention relates to an electric power steering system for vehicles.

2. Description of Relevant Art

In view of the problems of hydraulic type power steering system for vehicles because of a complicated structure, in recent years a variety of electric type power steering systems for vehicles have been proposed.

Those electric type power steering systems were all of a type including an input shaft such as a steering shaft connected to a steering wheel, an output shaft interconnected with the input shaft and, through a steering gear mechanism of a desired type, with a tie rod of a road wheel to be steered. Also provided were an electric motor for supplying the output shaft with auxiliary torque, a torque detection mechanism for detecting the magnitude as well as the direction of steering torque acting on the input shaft, and a driving control circuit for feeding the electric motor with an armature current of such a magnitude and in such a direction as necessary in accordance with a detection signal from the torque detection mechanism.

In the abpve-mentioned power steering systems, when the steering wheel was operated, the output shaft was supplied with an adequate auxiliary torque, thereby facilitating the steering operation.

As an example of such an electric power steering system for vehicles is one disclosed by Japanese Patent Application Lay-Open Print No. 59-70257 (laid open on Apr. 20, 1984), and another is disclosed by Japanese Patent Application Lay-Open Print No. 59-227560 (laid open on Dec. 20, 1984).

In the electric power steering system according to the first Lay-Open Print application, the steering gear mechanism was of a rack and pinion type and the torque detection mechanism was constituted with a strain gauge sensor disposed on the input shaft. This power steering system had produced, based on an output signal from the strain gauge sensor, a torque direction signal and a torque magnitude signal representing the direction in which the steering torque was acting on the input shaft and the magnitude of this steering torque, respectively, while sending, in accordance with these torque representative signals, the armature current of the required magnitude and in the required direction to the electric motor to thereby supply the output shaft with adequate auxiliary torque.

In the electric power steering system according to the second Lay-Open Print application, the steering gear mechanism was of a worm shaft and ball nut type. The input shaft was interconnected through a torsion bar with the output shaft, while the torque detection mechanism was constituted with a sliding resistance member secured to the input shaft and a contact piece secured to the output shaft. The contact piece were put in slidable contact with the sliding resistance member. Also this power steering system produced, based on an output signal from the sliding-resistance type torque detection mechanism, a torque direction signal and a torque magnitude signal, while sending, in accordance with these torque representative signals, the armature current to the electric motor, similar to the steering system according to the former Lay-Open Print.

In both examples according to the aforesaid Japanese Patent Application Lay-Open Prints, the torque direction signal and the torque magnitude signal produced were based on the output signal from the torque detection mechanism, that is, a pair of torque representative signals were generated in accordance with a detection signal from a single signal source.

Typically in a vehicle having a front steered ground wheel, when the direction of travel is changed while the vehicle is traveling straight, the front wheel is turned in either direction from a neutral position thereof by operating a steering wheel, thereby turning.

In such a turn, based on the wheel alignment of the front wheel as well as self-aligning torque due to deformations of a tire, righting moment acts on the front wheel, with a tendency to return the front wheel to the neutral position.

Where the steering system of such a vehicle is of an ordinary type having no auxiliary torque supplied thereto, the strength of steering forces applied to the steering wheel by the driver's hands is gradually reduced to zero while the vehicle is turning causing the front wheel to move with the righting moment to gradually returning to the neutral position. When the front wheel is returned to the neutral position, the vehicle again travels in a forward straight direction.

Such a state of transition of travelling is frequently experienced when turning corners with a vehicle equipped with an ordinary type steering system.

On the other hand, if the vehicle is equipped with either of the electric power steering systems according to the aforesaid Japanese Patent Application Lay-Open Prints, the possibility of experiencing a problem as described below is found when returning from turning state to a straight travel.

A description will now be made of an exemplary case in which a vehicle returns from a rightwardly turning state to traveling straight.

In the rightwardly turning state of the vehicle, the steering wheel has steering forces applied thereto through the driver's hands with a tendency to produce clockwise rotation thereof. Under such a condition, as the strength of the steering forces is substantially reduced to zero in a relatively short time by gradually releasing or lightly holding the steering wheel, the front wheel tends to return to the neutral position within a relatively short time, by the effect of a righting moment acting on the rightwardly turned front wheel, which turns the wheel to the left or in the counterclockwise direction when viewed from above, that is, from the side of the driver. Concurrently, however, the output shaft of the power steering system, to which the righting moment is transmitted in the form of counterclockwise torque, is caused to quickly rotate counterclockwise. Such counterclockwise rotation of the output shaft corresponds to a clockwise rotation of the input shaft relative to the output shaft, so that the torque detection mechanism detects false steering torque acting clockwise about the input shaft. Accordingly, clockwise auxiliary torque of a certain magnitude is supplied to the output shaft from the electric motor. Thus, the front wheel slightly is turned to the right, resulting in a delay of the returning action of the front wheel as well as of the steering wheel to the neutral position.

Such a problem resulted from the constitution of the electric power steering systems according to the aforesaid Japanese Patent Application Lay-Open Prints in which both the torque direction signal and the torque magnitude signal were produced in accordance with the detection signal from one torque detection mechanism.

The present invention effectively solves the aforementioned problem of conventional electric power steering systems for vehicles.

SUMMARY OF THE INVENTION

According to the present invention, there is provided, in an electric power steering system (100) for a vehicle with a ground wheel to be steered, including a steering wheel (8), a steering shaft (101) connected to the steering wheel (8), an output shaft (3) operatively interconnected with the ground wheel, and an electric motor (5) for operatively supplying the output shaft (3) with auxiliary torque. Also provided are a torque detecting means (4, 9) for detecting the direction and the magnitude of steering torque acting on the steering shaft (101), and a driving control circuit (50) for generating a torque direction signal (Sdr, Sdl) and a torque magnitude signal (Sa) based on an output signal (Sdr, Sdl, VR, VL) from the torque detecting means (4, 9), to feed the electric motor (5) with an armature current (Io) in such a direction and of such a magnitude as desirous in accordance with both the torque direction signal (Sdr, Sdl) and the torque magnitude signal (Sa). The steering shaft (101) includes a first shaft (1) connected to the steering wheel (8), a second shaft (2) operatively interconnected with the first shaft (1), a third shaft (3) as the output shaft (3) operatively interconnected with the second shaft (2), and a torque detecting means (4, 9) including a torque direction detecting mechanism (4) interposed between the first shaft (1) and the second shaft (2) and adapted to detect the steering torque acting on the steering shaft (101). A torque magnitude detecting mechanism (9) is interposed between the second shaft (2) and the third shaft (3) and adapted to detect the magnitude of the steering torque acting on the steering shaft (101).

Accordingly, an object of the present invention is to provide an electric power steering system for a vehicle with a steered ground wheel that may well be a front wheel thereof. The system permits, while the vehicle returns from a turning state to a straight travel thereof, the ground wheel as well as a steering wheel in the system to return to the neutral position in a smooth and rapid manner even when the strength of the steering forces, as they are applied to the steering wheel, is substantially rediced to zero in a relatively short with or without releasing the steering handle.

The above and further features, objects and advantages of the present invention will more fully appear from the following detailed description of a preferred embodiment of the invention when read in conjunction with the accompanying drawings.

BRIEF DESCRIPTION OF THE DRAWINGS

In the drawings:

FIG. 1 is a perspective view of an electric power steering system for vehicles according to a preferred embodiment of the present invention;

FIG. 2 is an enlarged perspective view of a torque direction detecting mechanism in the power steering system of FIG. 1;

FIG. 3 is an enlarged partial view of a quarter cutaway longitudinal section, about the axis of a steering shaft, of the torque direction detecting mechanism of FIG. 2;

FIG. 4A is a sectional view of an essential part of the torque direction detecting mechanism, taken along line 4A—4A of FIG. 3;

FIGS. 4B and 4C are plan and side views of a torque direction detecting tubular member in the detecting mechanism of FIG. 4A respectively;

FIG. 5 is an enlarged view of a quarter-cutaway longitudinal section, about the axis of the steering shaft, of a torque magnitude detecting mechanism in the power steering system of FIG. 1;

FIGS. 7A-1 to 7A-4 as well as FIGS. 7B-1 to 7B-3 are graphs showing output characteristic curves of various circuitries of the driving control circuit of FIG. 6.

DETAILED DESCRIPTION OF THE PREFERRED EMBODIMENT

Figure 6:
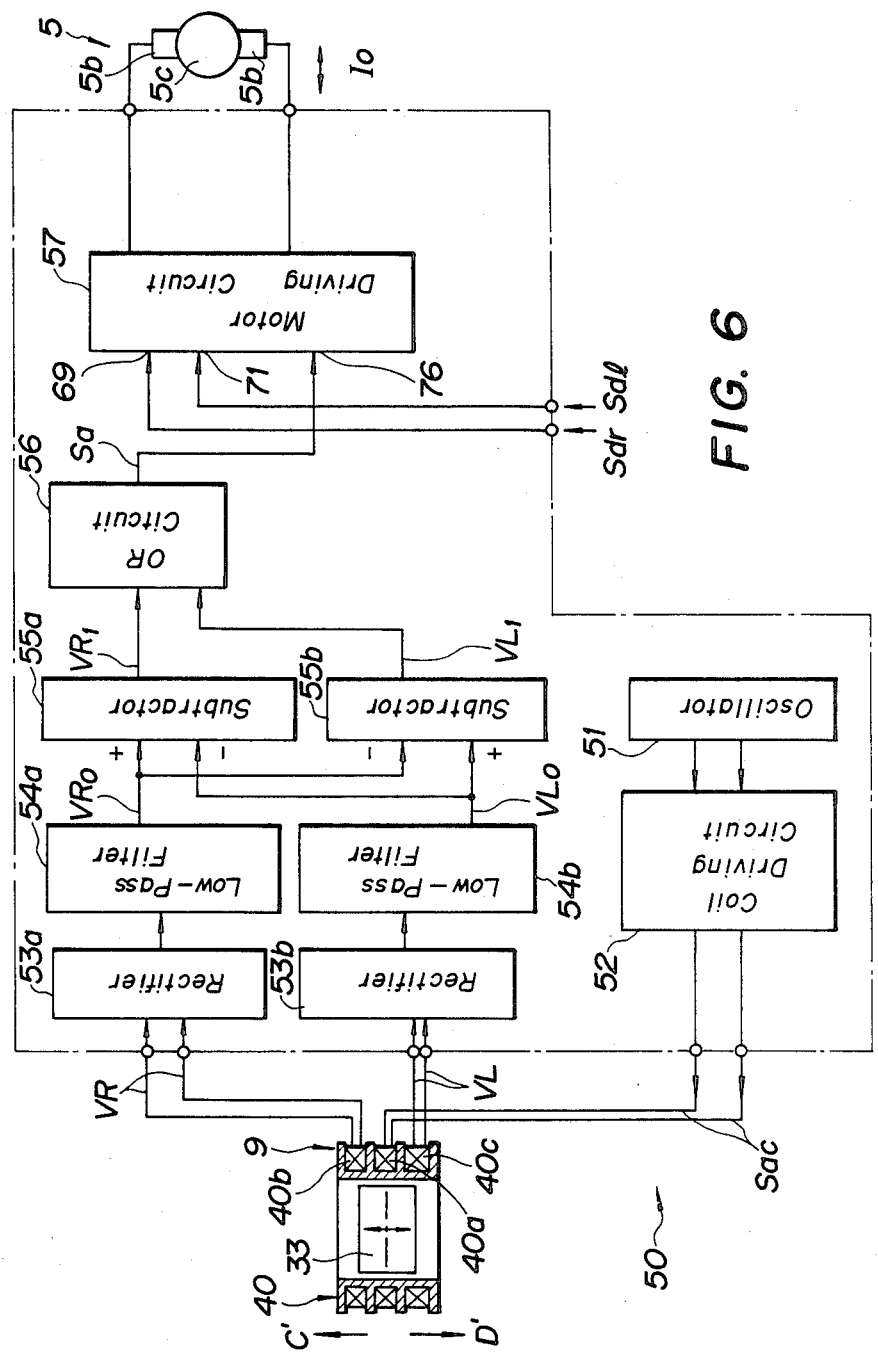
FIG. 6 is a block diagram of a driving control circuit in the power steering system of FIG. 1.

With reference to FIG. 1, designated at reference numeral 100 is the entirety of an electric power steering system according to a preferred embodiment of the present invention, as it is applied to a vehicle having a pair of ground wheels as left and right front wheels thereof to be steered.

The power steering system 100 includes a steering shaft 101, which comprises a first shaft 1 provided with a steering wheel 8 fixed to the upper end thereof, a second shaft 2 interconnected through a later-described torsion bar with the lower end of the first shaft 1, and a third shaft 3 interconnected with the second shaft 2 through another torsion bar described later. Between the first shaft 1 and the second shaft 2 is interposed a direction detecting mechanism 4 for detecting the direction of steering torque acting on the steering shaft 101. Between the second shaft 2 and the third shaft 3, a magnitude detecting mechanism 9 is interposed for detecting the magnitude of the steering torque.

The second shaft 2 has fixed on the intermediate part thereof a large-diameter gear 7 meshing with a small-diameter gear 6 which is fixed on a rotating output shaft 5a of an electric motor 5 controlled in the driving thereof in a later described manner. When the motor 5 is energized to start rotation, electromagnetic torque thereby developed is transmitted, while being reduced in the speed of rotation, as assist power through the gears 6, 7 to the second shaft 2, that is, corresponding auxiliary torque is supplied to the steering shaft 101.

The third shaft 3 is further interconnected, by means of a universal joint 10, with an intermediate shaft 11, which in turn is connected through another universal joint 12 to a pinion (not shown) assembled in a steering gearbox 13 which is of a rack and pinion type. The steering gearbox 13 has transversely projected therefrom left and right output portions 13a, 13b of a rack each interconnected through a tie rod to a pair of knuckle arms (not shown) provided for the left and right front wheels, respectively.

In FIG. 1 designated at reference numeral 14 is a control circuit box for accommodating therein a later-described driving control circuit 50, which is fed with detection signals Sdr, Sdl and VR, VL output from the direction detecting mechanism 4 and the magnitude detecting mechanism 9 respectively and representative of the steering torque acting on the input shaft 101. The detection signals Sdr, Sdl and VR, VL are processed in the control circuit 50 in a later-described manner to obtain an armature current Io to be sent as a driving control signal to the electric motor 5.

FIG. 2 is an enlarged perspective view of the torque direction detecting mechanism 4, including the torsion bar or elastic member coaxially interconnecting the first and the second shafts 1, 2 with each other. The torsion bar is designated by reference numeral 15. Further, shown in FIG. 3 is a longitudinal sectional view of an essential part of the mechanism 4. The first and the second shafts 1, 2 rotatably supported at respective vehicle body sides thereof, are fitted in, to be coupled with, each other in such a manner that the first shaft 1 has, in the lower end part thereof, an axially projected end portion rotatably fitted through a needle bearing 16 in an axial opening in the opposed end face of the second shaft 2. The circumferential part of this opening is formed with a pair of radially cut portions 2a, 2a having projected therein a pair of radially outwardly stepped arm-like portions 1a, 1a of the lower end part of the first shaft 1. Around such mutually fitted parts of the first and the second shafts 1, 2 is fitted an axially slidable tubular member 17 made of an electrically non-conductive material. The tubular member 17 has a pair of sets of elongate holes 17a, 17b radially cut therethrough to be symmetrical to each other with respect to the axis of the steering shaft 101, as shown in FIGS. 4A to 4C. One set of elongate holes 17a is formed at the left and right sides of the shaft 101 and inclined in the side view relative to the axis thereof. The other set of elongate holes 17b is formed at the top and bottom sides of the shaft 101 so as to be parallel with the axis thereof. In each of the inclined holes 17a is inserted one of a pair of radial pins 18, 18 fixed to the first shaft 1, and in each of the parallel holes 17b, one of a pair of radial pins 19, 19 fixed to the second shaft 2.

According to the foregoing arrangement, when the first shaft 1 is forced, with steering torque applied to the steering wheel 8, to rotate in the clockwise direction A or counterclockwise direction B in FIG. 1, the steering torque is transmitted through the torsion bar 15 to the second shaft 2. Concurrently, however, due to the load imposed on the second shaft 2 from the steering gear box 13 side, there is developed a phase difference or relative angular displacement between the first and the second shafts 1, 2, causing the tubular member 17, which is engaged at the elongate holes 17a, 17b thereof with the radial pins 18, 19 as described, to move in the axial direction of the steering shaft 101. In other words, as the first shaft 1 is forced to rotate clockwise or counterclockwise relative to the second shaft 2, developing a relative angular displacement therebetween, the tubular member 17 is caused to axially move in the direction C or D in FIG. 2.

In this respect, under the condition that no steering torque is applied to the first shaft 1, the tubular member 17 is set to be held at an original position thereof, that is, at a predetermined axial position on the steering shaft 101, while the radial pins 18, 19 are located at the longitudinally central parts of the elongate holes 17a, 17b of the member 17, respectively.

At both axial ends of the tubular member 17, there are provided a pair of limit switches 20, 21 having a pair of switch-operating elements 20a, 21a adapted to be actuated in accordance with axial movements of the member 17 in such a manner that, when the member 17 is moved in the direction C or D until it exceeds an axial limit thereof at a predetermined distance from the original position, the switch 20 or 21 becomes closed, whereby the steering torque acting on the first shaft 1 is detected with respect to the acting direction thereof.

The aforementioned detection signals Sdr, Sdl are output in accordance with open-close actions of the switches 20, 21. The signals are fed to the driving control circuit 50. More particularly, the signal Sdr which corresponds to the detection of clockwise torque is output from the switch 20 and has a signal state thereof determined to be alternatively "on" or "off", such that, when the first shaft 1 has developed on displacement relative to the second shaft 2 larger than a predetermined phase difference with clockwise steering torque applied to the steering wheel 8, thereby causing the tubular member 17 to move beyond the axial limit in the direction C, then the torque direction signal Sdr assumes an "on" state, while otherwise this signal Sdr remains "off". Likewise, the other signal Sdl, which corresponds to the detection of counterclockwise torque and which is output from the switch 21, has a signal state thereof controlled to be alternatively "on" or "off", such that, contrary to the above described signal Sdr, when the tubular member 17 is moved beyond the axial limit in the direction D, the torque direction signal Sdl assumes an "on" state, while otherwise this signal Sdl remains "off".

A description will now be made of the torque magnitude detecting mechanism 9 interposed between the second and the third shafts 2, 3, with reference to FIG. 5 which is a longitudinal sectional view of the mechanism 9.

The second shaft 2 and the third shaft 3 are coaxially interconnected with each other by the aforementioned torsion bar or elastic member, which is designated by reference numeral 30. The shafts are fitted to be coupled with each other by means of a mutual engagement structure similar to that shown in FIGS. 4A to 4C which is employed between the first and the second shafts 1, 2. Moreover, around respective mutually fitted parts of the second and the third shafts 2, 3 is fitted an axially slidable tubular member 33 analogous to the aforesaid tubular member 17, which member 33 has formed at both lateral sides thereof a pair of inclined elongate holes 33a engaging with a pair of radial pins 31 secured to the second shaft 2 and at the top and bottom sides thereof a pair of paralled elongate holes engaging with a pair of radial pins secured to the third shaft 3.

According to the foregoing arrangement, similar to the tubular member 17 in the torque direction detecting mechanism 4, when the second shaft 2 is caused to clockwise rotate relative to the third shaft 3, thereby developing a phase difference or relative angular displacement therebetween, the tubular member 33 of the torque magnitude detecting mechanism 9 is then forced to axially move in the direction C' in FIG. 5 to a position away from an original position thereof in correspondence to the relative angular displacement. Accordingly, when the second shaft 2 is rotated counterclockwise, the tubular member 33 is forced to likewise move in the direction D' in FIG. 5.

In this respect, when no steering torque is transmitted from the steering wheel 8 to the second shaft 2, the tubular member 33 is held at the original predetermined axial position on the steering shaft 101.

Incidentally, the tubular member 33 is made of a magnetic material thus being different from the tubular member 17 which is an insulating element.

Further, around the tubular member 33 is disposed a differential transformer 40 of a cylindrical configuration. Transformer 40 is secured to a body (not shown) of the vehicle. Installed in the differential transformer 40, are a single primary winding 40a and a pair of secondary windings 40b, 40c. The primary winding 40a is fed with an alternating-current signal Sac from the driving control circuit 50 or, more particularly, from an oscillator 51 through a primary coil driving circuit 52 (see FIG. 6). From the secondary windings 40b, 40c are output the aforementioned detection signals VR, VL which are fed to the driving control circuit 50 or, more particularly, to be input to a pair of rectifiers 53a, 53b, respectively (see FIG. 6).

In the foregoing arrangement, without torque applied to the second shaft 2, no phase difference is developed between the second and the third shafts 2, 3, and the tubular member 33 is set to be held at an axially central position of the differential transformer 40.

Described below, with reference to FIG. 6, will be the structure as well as the function of the driving control circuit 50. The control circuit 50 is adapted to feed the armature current Io to the electric motor 5 in accordance with the respective detection signals Sdr, Sdl and VR, VL from the torque direction detecting mechanism 4 and the torque magnitude detecting mechanism 9.

As aforementioned, the control circuit 50 includes the oscillator 51 cooperating with the coil driving circuit 52 to feed the primary winding 40a of the differential transformer 40 with the alternating-current signal Sac. With the primary winding 40a excited, the secondary windings 40b, 40c of the transformer 40 are energized to output the detection signals VR, VL as a pair of alternating-current signals of a predetermined frequency. The output signals VR, VL are set to be of an even amplitude while the magnetic tubular member 33 is held at the original position. As this member 33 is forced to move in the direction C' or D', the output signals VR, VL from the secondary windings 40b, 40c have, at the side where the member 33 is approaching, an increasing amplitude and, at the opposite receeding side, a decreasing amplitude.

Incidentally, in each of FIGS. 7A-1 to 7A-4 as well as B-1 to 7B-3, the abscissa represents the axial displacement of the tubular member 33, while the origin 0 corresponds to the original or neutral position thereof, positive abscissa values correspond to movements thereof in the direction C' in FIG. 5, that is, clockwise steering torque, and negative abscissa values correspond to movements thereof in the direction D' in FIG. 5, that is, counterclockwise steering torque.

The described characteristics of the secondary windings 40b, 40c of the differential transformer 40 are illustrated in FIGS. 7A-1, 7B-1. Shown in FIG. 7A-1 is an exemplary characteristic curve of the output signal VR from the secondary winding 40b, and FIG. 7B-1 shows an exemplary characteristic curve of the output signal VL from the secondary winding 40c.

The output signals VR, VL from the secondary windings 40b, 40c are first rectified through the rectifiers 53a, 53b and then smooth of ripples by a pair of low-pass filters 54a, 54b to output a pair of smoothed signals VRo, VLo, respectively. The output signal VRo from the low-pass filter 54a and the output signal VLo from the low-pass filter 54b, which have characteristic curves thereof exemplarily shown in FIGS. 7A-2 and 7B-2, respectively, are input to a pair of subtractors 55a, 55b, where they are processed through a pair of subtractive operations such that, at the subtractor 55a, $VR_1 = VRo - VLo$, provided that $VR_1$ becomes nearly equal to zero when $VRo \leq VLo$ and, at the subtractor 55b, $VL_1 = VLo - VRo$, provided that $VL_1$ becomes nearly equal to zero when $VLo \leq VRo$. As a result, the subtractors 55a, 55b have such characteristic curves of their output signals $VR_1$, $VL_1$ as are exemplarily shown in FIGS. 7A-3, 7B-3, respectively.

In this respect, the differential transformer 40 is connected such that, as the tubular member 33 is displaced from the original position in the direction C' in FIG. 6, that is, toward the secondary winding 40b, the magnitude of the signal $VR_1$ straight-linearly increases from zero in proportion to the displacement of the member 33 and that, as the member 33 is displaced from the original position in the direction D' in FIG. 6, that is, toward the secondary winding 40c, the magnitude of the signal $VL_1$ straightlinearly increases from zero in proportion to the displacement of the member 33.

Incidentally, the driving control circuit 50 has a power source no more than a single power supply (not shown) of positive polarity, except for power sources of the oscillator 51 and the primary coil driving circuit 52. Each of the subtractors 55a, 55b has its output signal set to be substantially zero volts at the positive voltage side, when its negative input terminal is fed with an input signal of a voltage not larger than an input signal fed to its positive input terminal.

Further with reference to FIG. 6, the output signals $VR_1$, $VL_1$ of the subtractors 55a, 55b are both input to an analogue OR circuit 56, where they are synthesized to obtain a signal Sa to be output therefrom. The signal Sa, of which the characteristic curve is such as an exemplarily shown in FIG. 7A-4, is employed as a torque magnitude signal for controlling the magnitude of the armature current Io to be fed to the electric motor 5, so that the magnitude of the current Io is directly proportional to that of the signal Sa, as will be described later.

The output signal Sa from the OR circuit 56 is input to an electric motor driving circuit 57. The output signals Sdr, Sdl from the torque direction detecting mechanism 4 are also input to the driving circuit 57 as torque direction signals. In the motor driving circuit 57, the signals Sa and Sdr, Sdl are processed in a later described manner to produce the armature current Io to be sent to the electric motor 5.

Incidentally, in FIG. 6, designated at reference characters 5b, 5b are commutating brushes of the electric motor 5, and 5c is a rotor as an armarture of the motor 5.

Figure 8:
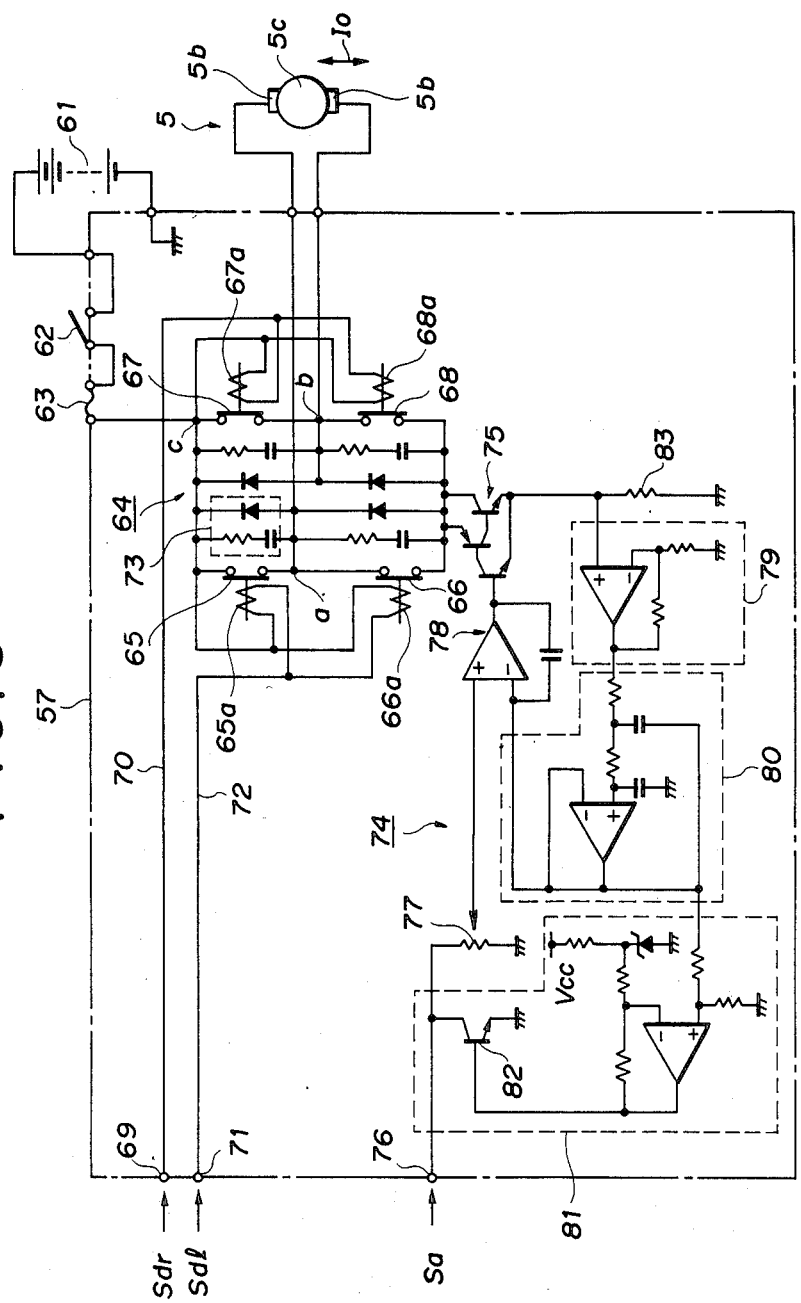
FIG. 8 is a circuit diagram of an electric motor driving circuit in the driving control circuit of FIG. 6.

Referring now to FIG. 8, which is a circuit diagram of the electric motor driving circuit 57, the circuit 57 will be described below with regard to the control actions that it applies to the electric motor 5 in accordance with the torque magnitude signal Sa and the torque direction signals Sdr, Sdl.

First, the control of rotating direction of the rotor 5a of the motor 5 will be described.

As shown in FIG. 8, the motor driving circuit 57 is provided with a direct-current power source 61 as a power supply for supplying a direct current to be utilized as the armature current Io. The direct current is supplied through a power switch 62 and a fuse 63 to a direction control circuit 64 which determines the direction of conduction of the armature current Io. The direction control circuit 64 comprises four relay switches 65, 66, 67, 68 controlled for on-off actions thereof with four exciting coils 65a, 66a, 67a, 68a. The relay switches 65, 66, 67, 68 interconnected into a bridge having output terminals a, b connected to the brushes 5b of the electric motor 5. The exciting coils 65a, 66a, 67a, 68a of the relay switches 65, 66, 67, 68 are connected to a line 70 provided with an input terminal 69 where the torque direction signal Sdr is input. The coils are also connected to another line 72 provided with another input terminal 71 where the torque direction signal Sdl is input. The connection of the coils 65a, 68a to the lines 70, 72 is made the same in the direction of conduction, while that of the coils 66a, 67a to the lines 70, 72 is reversed, so that, when the direction signal Sdr input to the terminal 69 is turned to "on", the switches 66, 67 open and concurrently the switches 65, 68 close. Similary, when the direction signal Sdl input to the terminal 71 is turned to "on", the switches 65, 68 open and concurrently the switches 66, 67 close.

As a result, the direction of the armature current Io is selected to be either from the terminel a to terminal b or from the terminal b to terminal a. More particularly, when the direction signal Sdr is "on", only the relay switches 65, 68 are closed, so that the direct current from the power source 61 is sent through a bridge terminal c, the switch 65, and the terminal a to the electric motor 5 and then returned from the motor 5, through the terminal b to the switch 68. To the contrary, when the direction signal Sdl is "on", only the relay switches 66, 67 are closed, so that the direct current from the power source 61 is sent through the terminal c, the switch 67, and the terminal b to the electric motor 5 and then returned from the motor 5 through the terminal a to the switch 66.

Incidentally, a protection circuit 73 is connected in parallel to each of the relay switches 65, 66, 67, 68. The circuit 73 consists of a diode, a resistor, and a condenser, to thereby prevent the discharge of sparks from the on-off actions of the switches 65 to 68.

The motor driving circuit 57 further includes a magnitude control circuit 74 for controlling the magnitude of the armature current Io. The control circuit 74 has a below described signal output therefrom to a transistor circuit 75 The circuit 75 consists of a trio of high-power transistors connected in series, Where the magnitude of the current Io is controlled in proportion to the signal input thereto.

The magnitude control circuit 74 is provided with a terminal 76 for receiving the torque magnitude signal Sa. The signal Sa is divided across a divider diresistor 77 into a necessary voltage and then input to an amplifier 78, where it is amplified to obtain the aforesaid signal output to the transistor circuit 75. Therefore, the armature current Io fed to the electric motor 18 has a magnitude proportional to the voltage of the torque magnitude signal Sa, so that the second shaft 2 has is applied thereto auxiliary torque of a magnitude proportional to the magnitude signal Sa.

The magnitude control circuit 74 further includes a non-inverting amplifier 79, a low-pass filter 80, and an overcurrent prevention circuit 81. The magnitude of the armature current Io is detected, by means of a resistance 83, in the form of a voltage signal. The voltage signal is fed back through the non-inverting amplifier 79 and the low-pass filter 80 to the amplifier 78, as well as to a transistor 82 in the overcurrent prevention circuit 81. The transistor 82 is connected in parallel to the resistor 77. In such a circuit arrangement, when the armature current Io is brought into an overcurrent state, the transistor 82 turns on, interrupting the supply of the magnitude signal Sa to the resistor 77, so that the current Io is prevented from being sent with excessive amperage to the electric motor 5.

As understood from the foregoing description, in the motor driving circuit 57, the armature current Io fed to the electic motor 5 is controlled in magnitude by the torque magnitude signal Sa input from the OR circuit 56, and in the direction of conduction by the torque direction signals Sdr, Sdl input from the torque direction detecting mechanism 4.

In the foregoing arrangement, when either the limit switch 20 or 21 of the torque direction detecting mechanism 4 is to be closed, the armature current Io fed to the electic motor 5 has the direction of conduction thereof determined in the driving control circuit 50, while the amperage of the armature current Io is determined in accordance with the detection signals VR, VL fed from the differential transformer 40 corresponding to the magnitude of torque in.

In this embodiment, the torsion bar 15 interconnecting the first and the second shafts 1, 2 with each other has a smaller spring rate in the twisting direction than the torsion bar 30 interconnecting the second and the third shafts 2, 3 with each other. Therefore, when the driver's steering forces increase above zero are applied to the steering wheel 8 with a tendency to produce either clockwise or counterclockwise rotation thereof, neither the limit switch 20 nor 21 is to be closed, thus leaving the electric motor 5 deenergized, and the relative angular displacement between the first and the second shafts 1, 2 is made larger than that between the second and the third shafts 2, 3.

The function of the electric power steering system 100 will be described below.

Any time the steering wheel 8 is operated in a normal manner, the driving control circuit 50 is cooperating with the torque direction detecting mechanism 4 and the torque magnitude detecting mechanism 9, to send to the electric motor 5 the armature current Io with an adequate magnitude and in an adequate direction of conduction, so that adequate auxiliary torque is supplied to the second shaft 2, that is, to the steering shaft 101, and thus transmitted also to the intermediate shaft 11, thereby facilitating the steering operation of the driver.

The function of the power steering system 100 will be described first with respect to a stage where a vehicle equipped with this system 100 is to experience going from a straight-forward travel into a rightwardly turning state, and then with respect to a subsequent stage in which the vehicle returns again to the straight-forward travel.

In straight-forward travel, the steering wheel 8 is held at a neutral position without relative angular displacements developed between the first and the second shafts 1, 2 nor between the second and the third shafts 2, 3. Thus both the tubular members 17, 33 of the torque direction and magnitude detecting mechanisms 4, 9 are located at their original positions, so that the electric motor 5 does not operate at all.

When steering forces are applied to rotate the steering wheel 8 in the clockwise direction, the first and the second shafts 1, 2 have a relative angular displacemet $D_{12}$ developed therebetween, causing the tubular member 17 to move in the direction C. When this member 17 has exceeded the preset axial limit, the limit switch 20 turns on. At this time, a relative angular displacement $D_{23}$ smaller than the angular displacement $D_{12}$ is developed between the second and the third shafts 2, 3 while the torque magnitude signal Sa has a voltage corresponding to the angular displacement D23.

In this respect, although not liminted to such case, the torque magnitude signal Sa has a signal value proportional to the steering torque acting on the steering shaft 101.

Because of the limit switch 20 being turned on, the torque direction signal Sdr output therefrom is now made "on". Thus, thereafter, the driving control circuit 50 feeds the electric motor 5 with the armature current Io controlled to be of an amperage proportional to the signal value of the torque magnitude signal Sa and in a direction of conduction correspondent to clockwise rotation of the motor 5. At the motor 5 is thus developed corresponding electromgnetic torque to be transmitted as clockwise auxiliary torque through the reduction gearing consisting of the small-diameter gear 6 and the large-diameter gear 7 to the second shaft 2. Resultant rotation of the steering shaft 101 is transmitted in the form of torque through the intermediate shaft 11 into the steering gearbox 13, whereby the front wheels are rightwardly steered, turning the vehicle to the right.

In such a rightwardly turning state, when the strength of the steering forces applied to the steering wheel is reduced substantially to zero in a relatively short time with or without releasing the steering wheel 8, the torsion bars 15, 30 positively function to return within a relatively short time the first, the second, and the third shafts 1, 2, 3 to the original positions thereof, where they have no relative angular displacements developed therebetween.

In this respect, by the function of the torsion bar 15, the relative angular displacement between the first and the second shafts 1, 2 is permitted to be relatively easily reduced to zero, thus turning "off" the torque direction signal Sdr, whereby the armature current Io is made zero, deenergizing and stopping the electric motor 5.

On the other hand, due to the righting moment described, each of the front wheels tends to return to a neutral position thereof within a relatively short time. Such righting moment is transmitted to the third shaft 3, which is thus forced to quickly turn to the left, that is, in the counterclockwise direction when viewed from the side of the first and the second shafts 1, 2.

Such a left turn of the third shaft 3 corresponds to a right turn of the second shaft 2 relative to the third shaft 3 and hence torque magnitude detecting mechanism 9 has detected a false steering torque clockwise acting about the second shaft 2, giving a certain value above zero to the torque magnitude signal Sa.

At the same time, the rapid leftward rotation of the third shaft 3 is transmitted through the torsion bar 30 to the second shaft 2, while tending to be further transmitted through the torsion bar 15 also to the first shaft 1.

In this respect, since the steering wheel 8 is substantially left free from steering forces applied thereto, the load to be now borne by the torsion bar 15 is based on no more than a very small moment of intertia due to the weights of the steering wheel 8 and the first shaft 1. Accordingly, where the second shaft 2 is rotated counterclockwise when viewed from the side of the first shaft 1, also the first shaft 1 is caused to rotate counterclockwise substantially integrally with the second shaft 2.

More specifically, the first shaft 1 is to rotate slightly to the left relative to the second shaft 2. However, with such a slight relative rightward rotation of the first shaft 1, the tubular member 17 of the torque direction detecting mechanism 4 will not be moved in the direction C so much that the limit switch 20 again becomes on. Thus, the torque direction signal Sdr is kept "off".

Accordingly, even when, in the driving control circuit 50, the signal VR1 based on the output signal VR from the torque magnitude detecting mechanism 9 has a certain value above zero, thus giving a certain value above zero to the torque magnitude signal Sa, the torque direction signal Sdr left "off" as described keeps the armature current Io at a zero level thereof, so that the electric motor 5 will not rotate again to the right.

As a result, each of the front wheels as well as the steering wheel 8 is righted to the neutral position in a smooth and rapid manner.

For the vehicle equipped with the electric power steering system 100, a similar result will be achieved also when the strength of steering forces applied to the steering wheel 8 is reduced substantially to zero in a relatively short time with or without releasing the steering wheel 8 to thereby return the vehicle from a leftwardly turning state to the straight-forward travel.

In this embodiment, when the relative angular displacement between the first and the second shafts 1, 2 has a value exceeding a predetermined phase difference, the arm-like portions 1a of the first shaft 1 are brought into abutment with the cut portions 2a of the second shaft 2, whereby the first and the second shafts 1, 2 are caused to rotate integrally with each other. Such a concept facilitates the provision of a failsafe design in the power steering system 100. Similar facilitation is achieved also at the mutually fitted region between the second and the third shafts 2, 3.

Incidentally, in this embodiment, electromagnetic torque developed at the electric motor 5 is supplied as auxiliary torque to the second shaft 2. In this respect, such auxiliary torque may preferably be applied to the third shaft 3 or to the intermediate shaft 11.

Further, in this embodiment, the steering gear mechanism in the steering gearbox 13 is of a rack and pinion type. However, in a preferred modification, a voluntary type of steering gear mechanism may be employed, provided that a righting moment of a steered front ground wheel is mechanically transmitted at the side of a steering shaft.

Furthermore, in this embodiment, the spring rate of the torsion bar 15 is set smaller than that of the torsion bar 30. Such a relation of the spring rates may advantageously be modified in a voluntary manner by adequately changing the distance from the original position of the tubular member 17 to the axial limit thereof at which the limit switch 20 or 21 is to be closed.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An electric power steering system for a vehicle with a ground wheel to be steered, comprising:

a steeering wheel;

a steering shaft connected to said steering wheel;

an output shaft operatively interconnected with the ground wheel;

an electric motor for operatively supplying said output shaft with auxiliary torque;

torque direction detecting means for detecting the direction of steering torque acting on said steering shaft;

torque magnitude of said steering torque acting on said steering shaft; and a driving control circuit for generating a torque direction signal and a torque magnitude signal based on output signals from said torque direction detecting means and said torque magnitude detecting means, to feed said electric motor with an armature current in such a direction and of such direction signal and said torque magnitude signal, wherein said steering shaft including a first shaft connected to said steering wheel, a second shaft operatively interconnected with said first shaft, and a third shaft as said output shaft operatively interconneted with said second shaft; and said torque direction detecting means having a first elastic member interposed between said first shaft and said second shaft and adapted to detect said steering torque as acting on said steering shaft, and said torque magnitude detecting means having a second elastic member interposed between said second shaft and said third shaft magnitude of said steering torque as acting on said steering shaft.

2. An electric power steering system according to claim 1, wherein:

said auxiliary torque from said electric motor is applied to said second shaft.

3. An electric power steering system according to claim 1, wherein:

said first elastic member has a smaller spring rate than said second elastic member.

4. An electric power steering system according to claim 1, wherein:

said output shaft is interconnected with the ground wheel through a rack and pinion type gear mechanism.

* * * * *